(12) United States Patent
Miyazaki et al.

(10) Patent No.: US 10,552,105 B2
(45) Date of Patent: Feb. 4, 2020

(54) PRINTING SYSTEM WITH SELF-PROPELLED PRINTER AND SERVICE PROHIBITION AREA

(71) Applicant: FUJI XEROX CO., LTD., Tokyo (JP)

(72) Inventors: Mariko Miyazaki, Kanagawa (JP); Hideki Fujimoto, Kanagawa (JP); Hajime Kajiyama, Kanagawa (JP); Naoya Ogata, Kanagawa (JP); Akira Ichikawa, Kanagawa (JP); Tetsuya Kobayashi, Kanagawa (JP); Kunitoshi Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 248 days.

(21) Appl. No.: 15/439,087

(22) Filed: Feb. 22, 2017

(65) Prior Publication Data
US 2018/0069935 A1 Mar. 8, 2018

(30) Foreign Application Priority Data
Sep. 8, 2016 (JP) .................................. 2016-175165

(51) Int. Cl.
*G06F 3/12* (2006.01)
*H04N 1/44* (2006.01)
*H04L 29/08* (2006.01)

(52) U.S. Cl.
CPC ............ *G06F 3/1238* (2013.01); *H04L 67/18* (2013.01); *H04N 1/4406* (2013.01); *H04N 1/4433* (2013.01)

(58) Field of Classification Search
CPC .... G06F 3/1291; G06F 3/1292; G06F 3/1238; G06F 3/1239; H04N 1/4406; H04N 1/4413; H04N 1/4433; H04N 1/00347
See application file for complete search history.

(56) References Cited

U.S. PATENT DOCUMENTS

| 2003/0214574 | A1* | 11/2003 | Saruhashi | H04N 7/147 348/14.01 |
| 2004/0169884 | A1* | 9/2004 | Yamada | H04N 1/00209 358/1.15 |
| 2011/0063670 | A1* | 3/2011 | Ito | G06F 3/1204 358/1.15 |
| 2013/0166348 | A1* | 6/2013 | Scotto | G06Q 30/0205 705/7.29 |
| 2015/0378652 | A1* | 12/2015 | Sakurai | H04N 1/00307 358/1.15 |

FOREIGN PATENT DOCUMENTS

| JP | 2001-125646 A | 5/2001 |
| JP | 2003-110779 A | 4/2003 |

* cited by examiner

*Primary Examiner* — Eric A. Rust
(74) *Attorney, Agent, or Firm* — Oliff PLC

(57) ABSTRACT

A service providing system includes a moving apparatus and a service provision instruction apparatus. The moving apparatus moves to a user who is within a service provision area within a predetermined zone, the predetermined zone including the service provision area and a service prohibition area, and provides a service to the user. The service provision instruction apparatus recognizes a position of a user within the zone and instructs the moving apparatus to provide a service to the user when the user is within the service provision area.

14 Claims, 20 Drawing Sheets

FIG. 6

- ○ USER GROUP — [USER GROUP 1 ▽]
- ○ USER — [USER 1 ▽]
- ☐ FIRST FLOOR
  - ☑ RESTROOM — 10
  - ☑ MEETING ROOM 1 — 60
  - ☑ MEETING ROOM 2 — 60
  - ☐ COFFEE BREAK AREA
  - ☐ MEETING AREA
- ☐ SECOND FLOOR
  ⋮
- ☑ THIRD FLOOR
  ⋮

[SET] [CANCEL]

| JOB ID | JOB NAME |
|---|---|
| 001 | ABC |
| 002 | DEF |
| ⋮ | ⋮ |

FIG. 10

|  | HOUR | MINUTE |
|---|---|---|
| ☐ TIME | [△▽] | [△▽] |

☐ PLACE

|  | PROHIBITED | PERMITTED |  |
|---|---|---|---|
| FIRST FLOOR | ○ | ◉ | |
| | ◉ | ○ | RESTROOM |
| | ◉ | ○ | MEETING ROOM 1 |
| | ◉ | ○ | MEETING ROOM 2 |
| | ◉ | ○ | COFFEE BREAK AREA |
| | ◉ | ○ | MEETING AREA |
| SECOND FLOOR | ○ | ◉ | |
| ⋮ | | | |
| THIRD FLOOR | ◉ | ○ | |
| ⋮ | | | |

[ SET ]　[ CANCEL ]

PRINTING SYSTEM WITH SELF-PROPELLED PRINTER AND SERVICE PROHIBITION AREA

CROSS-REFERENCE TO RELATED APPLICATIONS

This application is based on and claims priority under 35 USC 119 from Japanese Patent Application No. 2016-175165 filed Sep. 8, 2016.

BACKGROUND

(i) Technical Field

The present invention relates to a service providing system, a service provision instruction method, and a non-transitory computer readable medium.

(ii) Related Art

There is a service providing system including a self-propelled apparatus that propels itself in a predetermined area and provides a service.

SUMMARY

According to an aspect of the invention, there is provided a service providing system including a moving apparatus and a service provision instruction apparatus. The moving apparatus moves to a user who is within a service provision area within a predetermined zone, the predetermined zone including the service provision area and a service prohibition area, and provides a service to the user. The service provision instruction apparatus recognizes a position of a user within the zone and instructs the moving apparatus to provide a service to the user when the user is within the service provision area.

BRIEF DESCRIPTION OF THE DRAWINGS

Exemplary embodiments of the present invention will be described in detail based on the following figures, wherein:

FIG. 6 is a diagram illustrating a service prohibition area setting screen for a manager;

FIG. 10 is a diagram illustrating a print setting screen that is displayed upon "print setting" being pressed on the job menu screen illustrated in FIG. 9;

DETAILED DESCRIPTION

Hereinafter, exemplary embodiments of the present invention will be described.

Figure 1:
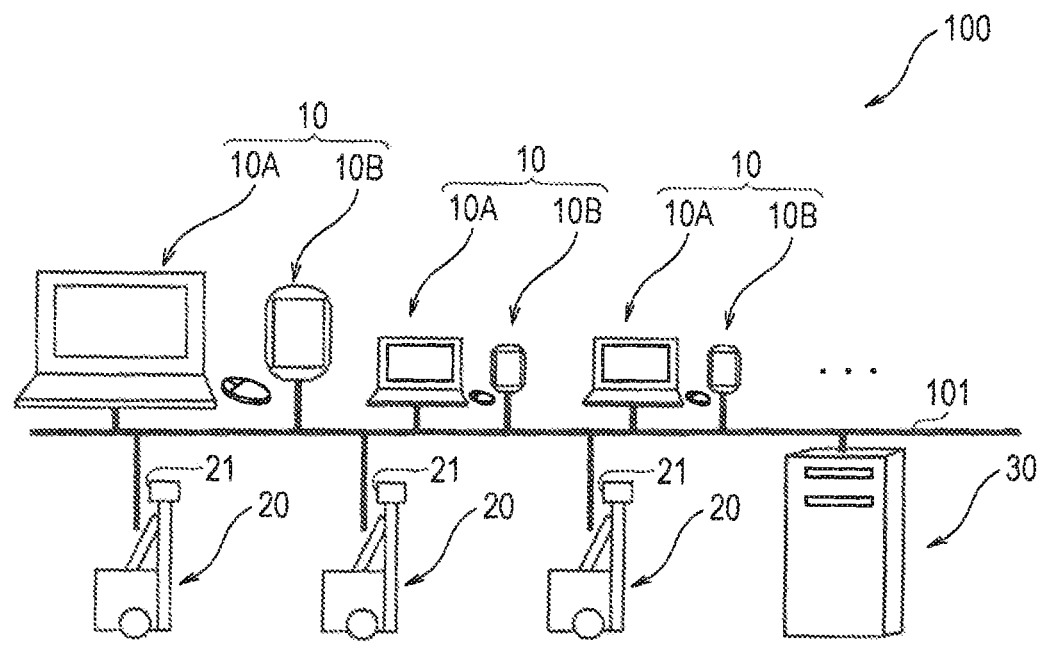
FIG. 1 is a diagram illustrating the overall configuration of a print system, which is a service providing system according to a first exemplary embodiment of the present invention.

FIG. 1 is a diagram illustrating the overall configuration of a print system 100, which is a service providing system according to a first exemplary embodiment of the present invention.

The print system 100 includes self-propelled printers 20, each of which moves to a user in response to a print instruction provided by the user and performs print output after obtaining approval from the user.

The print system 100 includes plural laptop personal computers (hereinafter referred to as laptop PCs) 10A and plural mobile terminal apparatuses (hereinafter referred to as mobile terminals) 10B. Among these laptop PCs 10A and mobile terminals 10B, a laptop PC 10A and a mobile terminal 10B synchronized by the same user forms a pair to serve as a client apparatus 10. Although the details will be described below, in each client apparatus 10, a job related to print output is generated by a user who uses the client apparatus 10. The job is transmitted from the client apparatus 10 and thereby an instruction to perform printing is provided.

Here, the "job" is a set of data of a document or the like to be printed out and various types of instruction data that is necessary to print out the document or the like.

The print system 100 also includes, for example, three self-propelled printers 20. Each self-propelled printer 20 includes a camera 21. The self-propelled printer 20 moves to a user who has provided a print output instruction while watching ahead through the camera 21 to avoid obstacles and performs print output after completing user authentication.

The print system 100 also includes a server apparatus 30. The server apparatus 30 temporarily stores a job received from each client apparatus 10 and transmits the job to one of the self-propelled printers 20 at appropriate timing so as to instruct the self-propelled printer 20 to perform print output. In the server apparatus 30, a print instruction program, which is an example of a service provision instruction program according to an exemplary embodiment of the present invention, is executed. Accordingly, the server apparatus 30 operates as a print instruction apparatus, which is an example of a service provision instruction apparatus according to an exemplary embodiment of the present invention.

The job transmitted by the server apparatus 30 includes information specifying a user who has provided a print output instruction and information indicating a current position of the user. In response to receipt of the instruction, the self-propelled printer 20 moves to the current position of the user and performs print output after completing user authentication.

The client apparatuses 10, the self-propelled printers 20, and the server apparatus 30 illustrated in FIG. 1 are connected to one another through a wireless local area network (LAN) 101 so that these apparatuses are capable of communicating with one another.

Figure 2:
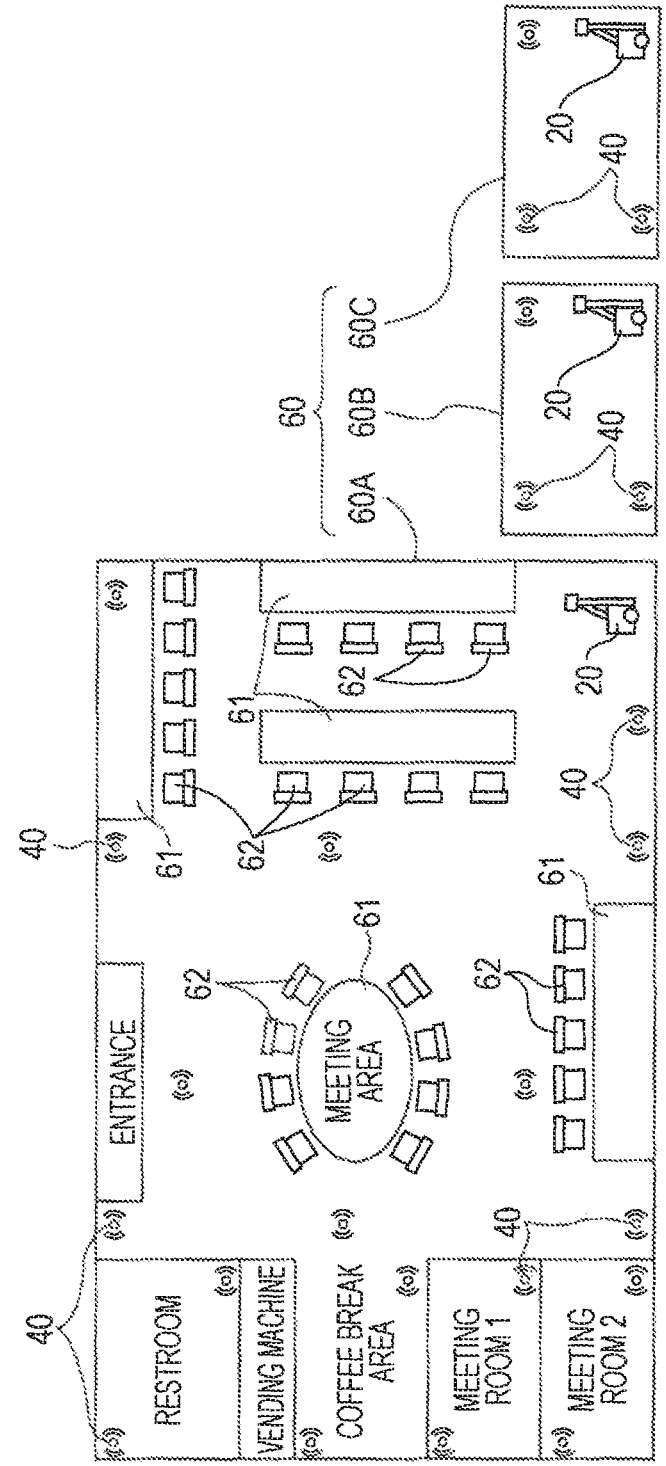
FIG. 2 is a schematic diagram illustrating a layout of an office.

FIG. 2 is a schematic diagram illustrating the layout of an office 60.

The office 60 includes three floors: a first floor 60A, a second floor 60B, and a third floor 60C, which are located on the first, second, and third floors of an office building, respectively. FIG. 2 illustrates the layout of rooms on the first floor 60A.

Plural tables 61 and plural chairs 62 are placed on each of the floors 60A to 60C of the office 60. Also, one self-propelled printer 20 is provided on each of the floors 60A to 60C of the office 60. For the self-propelled printer 20 provided on each of the floors 60A to 60C, a "standby position" is specified. For example, the standby position of the self-propelled printer 20 provided on the first floor 60A is the position of the self-propelled printer 20 illustrated in FIG. 2. There is a charging station (not illustrated) at each of the standby positions on the individual floors 60A to 60C. Each self-propelled printer 20 is configured to be charged at the charging station when arriving at the standby position, to move using the energy obtained through charging, and to perform print output using the energy.

Also, the first floor 60A of the office 60 is provided with, in addition to the tables 61 and the chairs 62 as office equipment used by individual users, a restroom, a coffee break area provided with a vending machine, a meeting room 1, a meeting room 2, and a meeting area. Although not illustrated, various areas are also provided on the second floor 60B and the third floor 60C, as on the first floor 60A.

Furthermore, in the office 60, beacons 40 are installed throughout the walls and ceilings of all the floors 60A to 60C. Each beacon 40 is a device that emits radio waves including ID information identifying the beacon. These beacons 40 are used to recognize the positions of users. The details will be described below.

In FIG. 2, the server apparatus 30 and a PC for a manager illustrated in FIG. 1 are not illustrated. These apparatuses are installed at a corner of the office 60 or in a room other than the office 60.

Information about individual users who have a right to use the print system 100 is registered in the server apparatus 30. The registered information includes the IDs of the mobile terminals 10B of the individual users.

Upon a user entering the office 60, communication between the mobile terminal 10B carried by the user and the server apparatus 30 through the wireless LAN 101 becomes possible, and the mobile terminal 10B communicates with the server apparatus 30 basically at a regular interval, for example, at an interval of 100 ms. The server apparatus 30 obtains the ID of the mobile terminal 10B through the communication and recognizes that a specific user has entered the office 60. In the office 60, the seats of individual users are not fixed. A user who has entered the office 60 sits on any one of the chairs 62 of unoccupied seats and carries out his/her work.

Upon the user leaving the office 60, the communication between the mobile terminal 10B and the server apparatus 30 ceases and the server apparatus 30 recognizes that the user has left. Note that the leave herein includes a case where the user completely leaves the office 60, for example, the user goes home, and also includes a case where the user temporarily leaves the office 60, for example, the user is moving from the first floor 60A to the second floor 60B. The restroom, the meeting rooms, and so forth illustrated in FIG. 2 are part of the office 60. Thus, when the user is in the restroom, the meeting rooms, or the like, it is not determined that the user has left the office 60.

The server apparatus 30 includes a database storing the layout of everywhere in the office 60, including the positions of the individual areas such as the restroom, the coffee break area provided with a vending machine, the meeting rooms 1 and 2, and the meeting area; the entrance to the office 60; the entrances to the individual meeting rooms; and the beacons 40 on the first floor 60A. The same applies to the second floor 60B and the third floor 60C.

Figure 3:
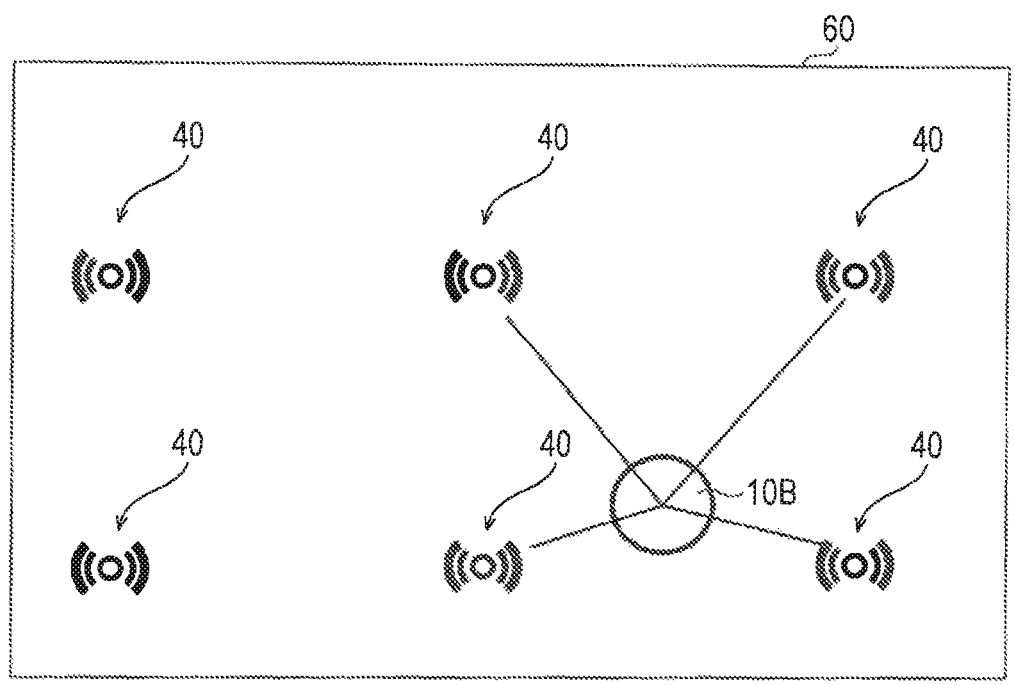
FIG. 3 is a diagram for describing the principle of recognizing the position of a user using beacons.

FIG. 3 is a diagram for describing the principle of recognizing the position of a user using beacons.

A user always carries his/her mobile terminal 10B when he/she moves in the office 60. The mobile terminal 10B carried by the user receives radio waves that are emitted by the plural beacons 40 and that include pieces of ID information of the individual beacons 40, associates the pieces of ID information of the individual beacons 40 with the reception intensities of the radio waves emitted by the individual beacons 40, and transmits the associated information together with the ID information of the mobile terminal 10B to the server apparatus 30. Accordingly, the server apparatus 30 is able to know the position of the mobile terminal 10B, that is, the position of the user in the office 60. When plural mobile terminals 10B exist in the office 60 at the same time, the server apparatus 30 is able to specify the positions of the individual mobile terminals 10B (the individual users) by using the pieces of ID information of the mobile terminals 10B.

Here, a description has been given of an example in which the positions of individual users are recognized by using the beacons 40. However, it is sufficient that facilities for recognizing the positions of the users in the office 60 are provided, and the method for recognizing the positions of the users is not limited to that using the beacons 40.

In the print system 100, a service prohibition area where a print output service is prohibited even within the office 60 may be set for each user, for each user group, or for each job. Hereinafter, a description will be given of a method for setting a service prohibition area and a method for providing a print service using information about the service prohibition area that has been set.

Figure 4:
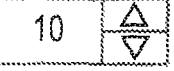
FIG. 4 is a diagram illustrating a service prohibition area setting screen that is displayed on a display screen of a client apparatus.

FIG. 4 is a diagram illustrating a service prohibition area setting screen that is displayed on a display screen of a client apparatus.

The users who have the right to use the print system 100 are provided with an application program (hereinafter referred to as an application) for using the print system 100, and the application is executed by each client apparatus 10. The service prohibition area setting screen illustrated in FIG. 4 is able to be opened by starting the application and selecting the service prohibition area setting screen on a menu screen of the application.

On the service prohibition area setting screen, a service prohibition area where a print output service is prohibited is set for each user. The names of areas that are settable as a service prohibition area, such as "restroom" and "meeting room 1", are arranged on this screen. FIG. 4 illustrates only the names of the areas on the first floor 60A, but the names of the areas on the second floor 60B and the third floor 60C may be displayed in the same manner. A time period is set on the right of the name of each area. To set a service prohibition area, a user inputs a check mark in the check box corresponding to the area to be set as a service prohibition area and also sets a time period. Here, all the areas on the floors 60A to 60C are settable as a service prohibition area. However, if all the areas on the floors 60A to 60C are set as a service prohibition area, the areas are set as a service prohibition area throughout the service provision hours unless a cancel instruction for each job is provided (described below). In the case of setting only one or some of the areas on the floors 60A to 60C as a service prohibition area, a user inputs a check mark in the check box corresponding to the area to be set as a service prohibition area, not in the check box corresponding to the entire floor, and designates a time period.

For example, in the example illustrated in FIG. 4, there are check marks in the check boxes corresponding to "restroom", "meeting room 1", and "meeting room 2" on the first floor, and 10 minutes, 60 minutes, and 60 minutes are respectively set. Also, there is a check mark in the check box corresponding to the third floor.

In this case, "restroom", "meeting room 1", and "meeting room 2" on the first floor, and the entire area of the third floor are set as a service prohibition area. Also, a setting is performed so that the position of the user is not checked for 10 minutes if it is determined that the user is in the restroom and that the position of the user is not checked for 60 minutes if it is determined that the user is in the meeting room 1 or the meeting room 2. This is because it is useless to continue the detection of the position of the user when the user is in the restroom or meeting room. After 10 minutes have elapsed from when it is determined that the user in in the restroom, check of the position is restarted. The same applies to the meeting room 1 and the meeting room 2 except that the time period until restart of check is different. Hereinafter, this time period is referred to as a "position detection prohibition period".

In the example illustrated in FIG. 4, the third floor is set as a service prohibition area. In this case, no service is provided to the user anytime while the user is on the third floor, unless the user moves to the first floor or the second floor.

The setting on the service prohibition area setting screen illustrated in FIG. 4 is confirmed by clicking a "set" button. If a "cancel" button is clicked, the service prohibition area setting screen disappears from the display screen of the client apparatus 10, the setting performed this time is invalidated, and the preceding setting becomes validated.

Figure 5:
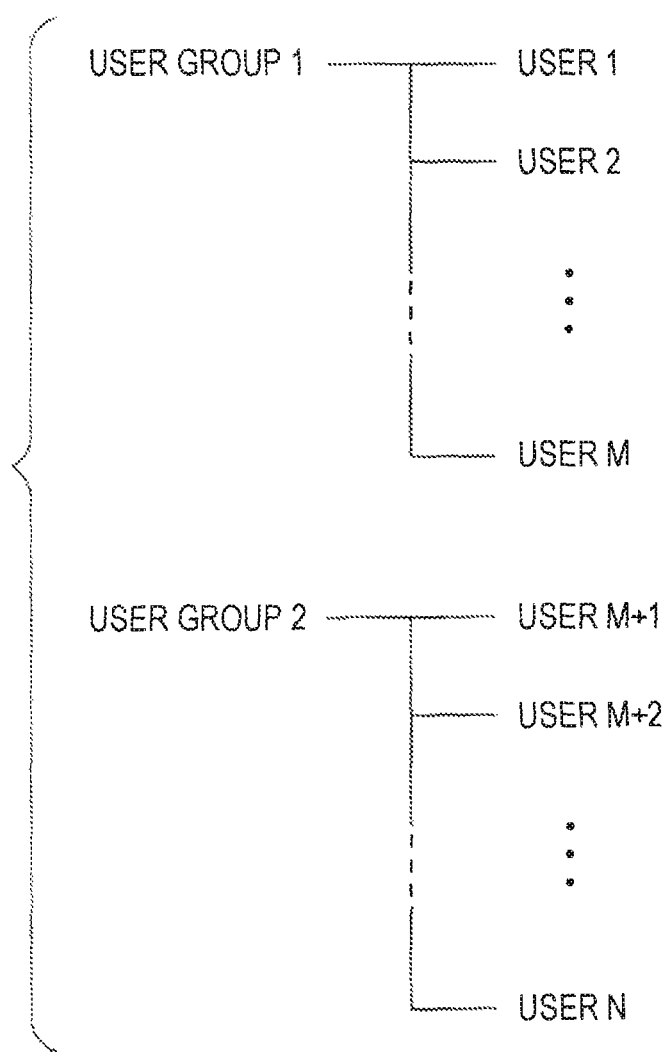
FIG. 5 is a diagram illustrating user list data stored in a database in a server apparatus.

FIG. 5 is a diagram illustrating user list data stored in the database in the server apparatus 30.

The users of the print system 100 are grouped into plural groups according to the intended use of the print system 100. The manager of the print system 100 is able to, for example, permit the users belonging to a user group 1 to use a service on the first floor 60A and the second floor 60B and prohibit the users belonging to the user group 1 from using a service on the third floor 60C.

FIG. 6 is a diagram illustrating a service prohibition area setting screen for a manager.

In the illustration in FIG. 1, an apparatus for a manager is not distinguished from the client apparatuses 10. The manager uses an apparatus similar to the client apparatuses 10 and inputs a password for a manager to start an application, so that the manager is able to open the service prohibition area setting screen for a manager illustrated in FIG. 6.

The service prohibition area setting screen for a manager illustrated in FIG. 6 is different from the service prohibition area setting screen for each user illustrated in FIG. 4 in that fields for designating "user group" or "user" are added. Here, either of "user group" and "user" is selected by using a radio button. If "user group" is selected, a specific user group is selected from a pull-down menu of "user group", whereas if "user" is selected, a specific user is selected from a pull-down menu of "user". Accordingly, a service prohibition area is set for all the users belonging to the selected specific user group or the selected specific user.

The setting on the service prohibition area setting screen for a manager illustrated in FIG. 6 is given higher priority than the setting on the service prohibition area setting screen for each user illustrated in FIG. 4. That is, a user belonging to a user group set on the service prohibition area setting screen for a manager illustrated in FIG. 6 or a user set on the service prohibition area setting screen for a manager is not able to change a service prohibition area from the service prohibition area setting screen that is opened on his/her client apparatus 10.

Figure 7:
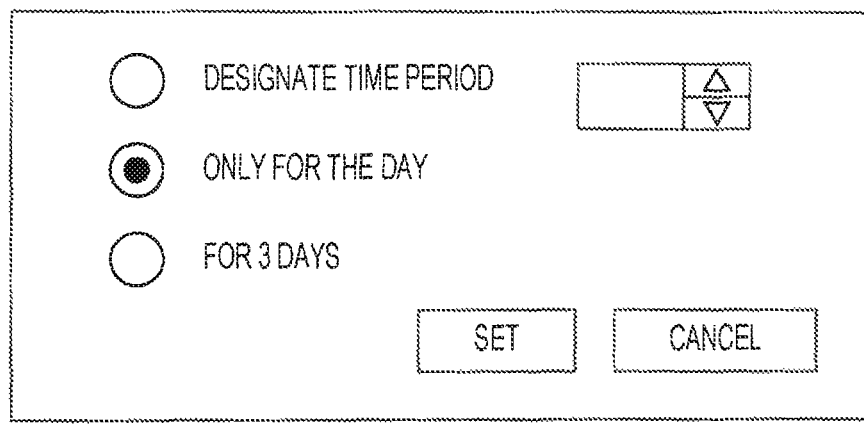
FIG. 7 is a diagram illustrating a jog hold period setting screen.

FIG. 7 is a diagram illustrating a job hold period setting screen. This is a screen that is opened on the client apparatus 10 operated by each user, like the service prohibition area setting screen.

When a user is in a service prohibition area or when congestion of print instructions occurs, for example, there is a possibility that print output is not performed even if the user transmits a job to provide a print output instruction. That is, when the server apparatus 30 receives a print output instruction by receiving a job, the server apparatus 30 stores the job in the server apparatus 30 and provides a print output instruction to the corresponding self-propelled printer 20 at appropriate timing. However, there is a possibility that time elapses without the appropriate timing coming. In this case, the server apparatus 30 does not hold the job forever, but discards the job after holding the job for the time period set on the job hold period setting screen illustrated in FIG. 7. The job hold period is set for each user by the client apparatus 10.

On the job hold period setting screen illustrated in FIG. 7, options "designate time period", "only for the day", and "for 3 days" are arranged. When "designate time period" is selected, the time period for which the job is to be held in the server apparatus 30 after the client apparatus 10 transmits the job, for example, 3 hours, is set. When "only for the day" is selected, the job is held until the end of the service provision hours of the print system 100 of the day the job is transmitted in the print system 100. When "for 3 days" is selected, the job is held until the end of the service provision hours of the day two days after the day the job is transmitted. The initial setting is "only for the day", which is changeable by each user.

Figures 8, 9:
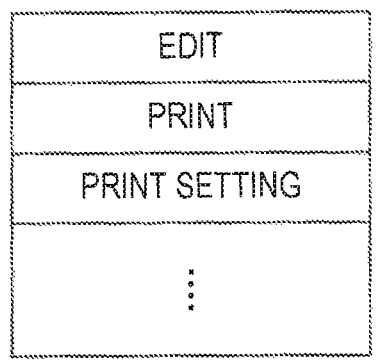
FIG. 8 is a diagram illustrating a job list screen.
FIG. 9 is a diagram illustrating a job menu screen.

FIG. 8 is a diagram illustrating a job list screen.

In each client apparatus 10, if a user creates a document or the like, the document is registered as a job in the client apparatus 10 prior to print output. In the client apparatus 10, a screen showing a list of registered jobs may be displayed as illustrated in FIG. 8. In the example illustrated in FIG. 8, a job with a job ID "001" and a job name "ABC" and a job with a job ID "002" and a job name "DEF" have been registered.

FIG. 9 is a diagram illustrating a job menu screen.

If a user selects a specific job on the job list screen illustrated in FIG. 8 and performs so-called right click or the like, the menu screen regarding the selected job illustrated in FIG. 9 is opened as a pop-up screen.

On the menu screen illustrated in FIG. 9, "edit", "print", "print setting", . . . are arranged. "Edit" is an item to be pressed for adding something to the document of the job or correcting the document. "Print" is an item to be pressed for providing an instruction to print the document of the job. "Print setting" is an item to be pressed for setting the time to perform print output of the job or setting a service prohibition area.

FIG. 10 is a diagram illustrating a print setting screen that is displayed upon "print setting" being pressed on the job menu screen illustrated in FIG. 9.

Here, "time" and "place" are set.

In the field "time", the time to perform print output is set. In this field, a certain time from the current time to the end of the service provision hours of the day is set in units of minutes. If "print" illustrated in FIG. 9 is pressed after the time is set in this field, a corresponding job is transmitted to the server apparatus 30. The job is temporarily stored in the server apparatus 30, and a print output instruction is provided to the corresponding self-propelled printer 20 when the set time comes.

In the field "place", "prohibited" or "permitted" is selectable for each area that is settable as a service prohibition area. This setting is valid only in the present job. For example, it is assumed that a user sets "meeting room 1" as a service prohibition area on the service prohibition area setting screen for the user as illustrated in FIG. 4, and that the user wants the self-propelled printer 20 to enter "meeting room 1" and wants to receive a print service only in the present job. In this case, the user sets the radio button of "meeting room 1" to "permitted" on the print setting screen illustrated in FIG. 10.

However, there are items that are not settable on the print setting screen illustrated in FIG. 10. For example, it is impossible to change the setting for an area where the change is undesirable. Specifically, it is impossible to change the setting for "restroom" to "permitted". Also, it is impossible to change the setting to "permitted" for an area that has been set as a service prohibition area for the user by the manager (see FIG. 6). With these exceptions, it is possible to change the service prohibition area and the service provision area for each job. The setting on the service setting screen illustrated in FIG. 10 is given higher priority than the setting on the service prohibition area setting screen for each user illustrated in FIG. 4. Note that the setting on the service setting screen illustrated in FIG. 10 is valid only in the job.

Figure 11:
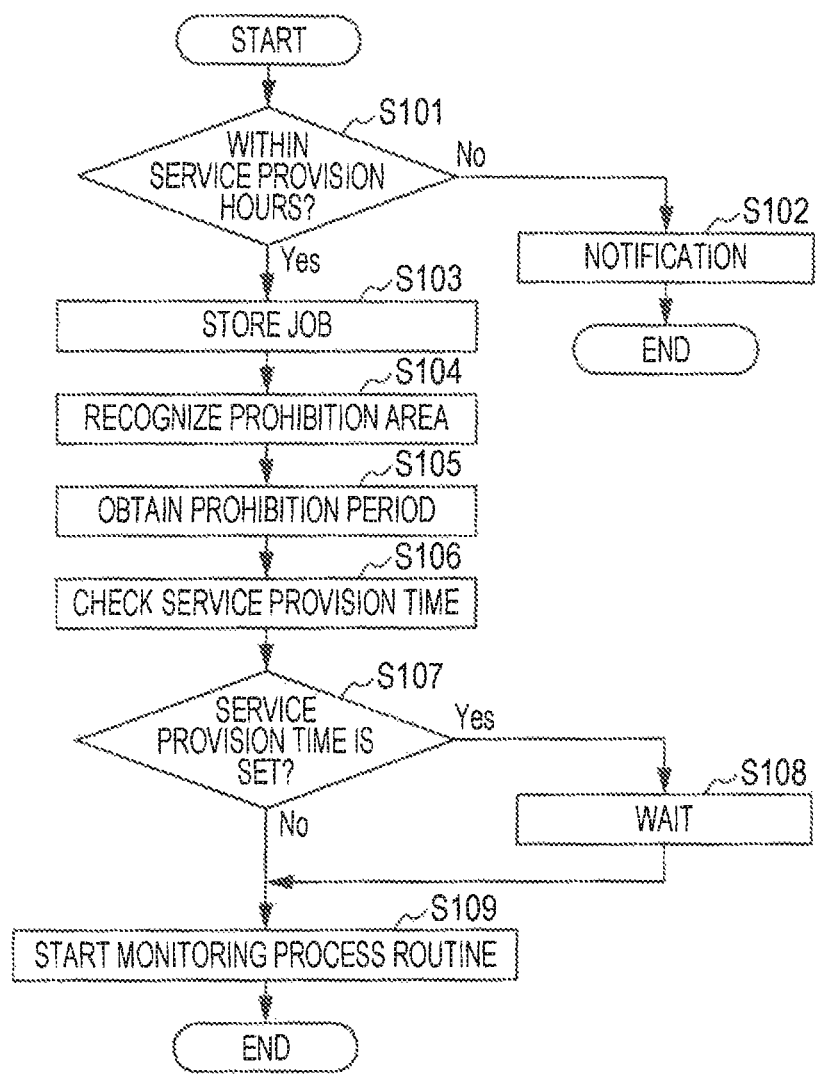
FIG. 11 is a diagram illustrating a flowchart of a job reception process routine that is performed by the server apparatus when the server apparatus receives a print output instruction (job) from the client apparatus.

FIG. 11 is a diagram illustrating a flowchart of a job reception process routine that is performed by the server apparatus 30 when the server apparatus 30 receives a print output instruction (job) from the client apparatus 10.

In response to receipt of a job transmitted from the client apparatus 10, the server apparatus 30 checks the current time and determines whether or not the current time is within the service provision hours (step S101). If the current time is out of the service provision hours, the server apparatus 30 notifies the client apparatus 10 that has transmitted the job that the current time is out of the service provision hours (step S102) and ends the job reception process.

Figure 12:
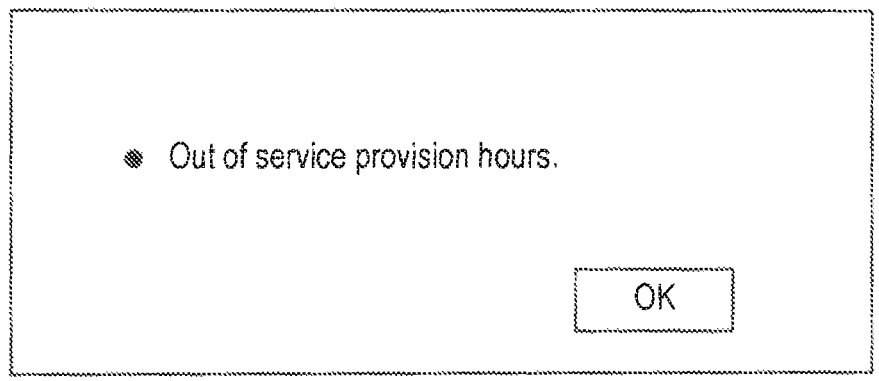
FIG. 12 is a diagram illustrating a notification screen that is displayed on the display screen of the client apparatus that has received a notification in a step in FIG. 11.

FIG. 12 is a diagram illustrating a notification screen that is displayed on the display screen of the client apparatus 10 that has received the notification in step S102 in FIG. 11.

Here, a message "out of service provision hours" is displayed.

Referring back to FIG. 11, a further description will be given.

If it is determined in step S101 that the current time is within the service provision hours, the server apparatus 30 stores the job transmitted this time in the server apparatus 30 (step S103). Subsequently, the server apparatus 30 recognizes a service prohibition area and obtains a position detection prohibition period (step S104 and step S105). In step S104, a service prohibition area for the present job is recognized with reference to information about a service prohibition area that is set for the user who uses the client apparatus 10 that has transmitted the present job (see FIGS. 4 and 6) and information about a service prohibition area accompanying the job (see FIG. 10). In step S105, a position detection prohibition period that is set for each service prohibition area (see FIGS. 4 and 6) is obtained. The position of the user who has transmitted the present job is unknown at this stage, and thus information about all the position detection prohibition periods that are set for individual service prohibition areas is obtained in association with the individual service prohibition areas.

Subsequently, the server apparatus 30 checks the time when the print output service is to be provided (see FIG. 10) for the present job (step S106). If the time when the print output service is to be provided is set (step S107), the server apparatus 30 waits till the time (step S108) and then starts a monitoring process routine described below (step S109). If the time is not set, the server apparatus 30 immediately starts the monitoring process routine (step S109). To start the monitoring process routine, the user of the present job is specified, and also information about the service prohibition area for the present job recognized in step S104 and information about the position detection prohibition period obtained in step S105 are provided to the monitoring process routine.

Figure 13:
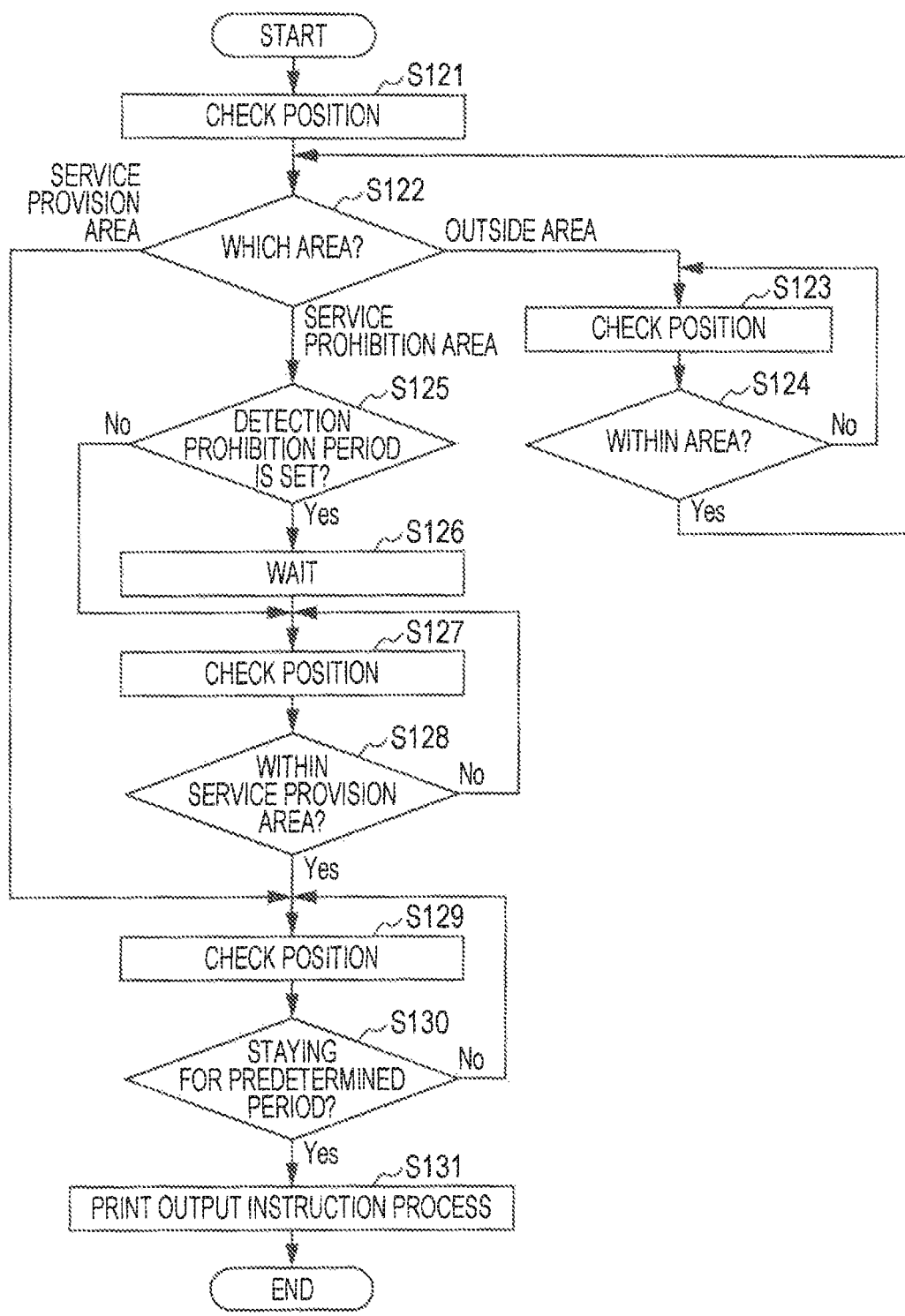
FIG. 13 is a diagram illustrating a flowchart of a monitoring process routine.

FIG. 13 is a diagram illustrating a flowchart of the monitoring process routine.

Upon the monitoring process routine being started, the server apparatus 30 checks the position of the user of the present job (step S121). In this exemplary embodiment, the position is checked by using the beacons 40 (see FIGS. 2 and 3). As a result of checking the position, the server apparatus 30 determines whether the user is in the service provision area, in the service prohibition area, or outside the office 60 (outside the area, that is, it is impossible to detect the position) (step S122). If it is determined that the user is outside the area, the server apparatus 30 repeats check of the position (step S123). The check is performed at a long interval, for example, once a minute. If it is determined that the user is within the area (step S124), the process returns to step S122.

If it is determined in step S122 that the user is in the service prohibition area, since the area in the service prohibition area where the user exists is recognized at this stage, the server apparatus 30 determines whether or not a position detection prohibition period is set in the area where the user exists (step S125). If the user is in the service prohibition area where the position detection prohibition period is set, the server apparatus 30 waits for the position detection prohibition period (step S126) and then repeats check of the position (step S127) until the user comes back to the service provision area (step S128). If the user is in the service prohibition area where the position detection prohibition period is not set (for example, the third floor illustrated in FIGS. 4 and 6), the server apparatus 30 repeats check of the position (step S127) until the user comes back to the service provision area (step S128), without waiting. The check of the position in step S127 is performed at a long interval, for example, once a minute, so that no process burden is imposed on the server apparatus 30.

If it is determined in step S122 that the user is in the service provision area or if it is determined in step S128 that the use has come back to the service provision area, the server apparatus 30 repeats check of the position of the user at an interval of, for example, 10 seconds (step S129). If it is determined that the user has been staying at the same position for a predetermined period, for example, for one minute (step S130), the server apparatus 30 starts a print output instruction process routine (described below) using the position information on the user (step S131).

Here, check of the position in step S123 or step S127 is performed at a long interval, for example, once a minute. Thus, the determination that the user has come back to the service provision area is performed with a delay corresponding to the interval. For example, if the position is checked once a minute, the determination that the user has come back to the service provision area is performed with a delay of one minute at the maximum. However, such a delay is negligible because it takes the time nearly corresponding to the maximum delay for the user to go back to his/her seat.

Figure 14:
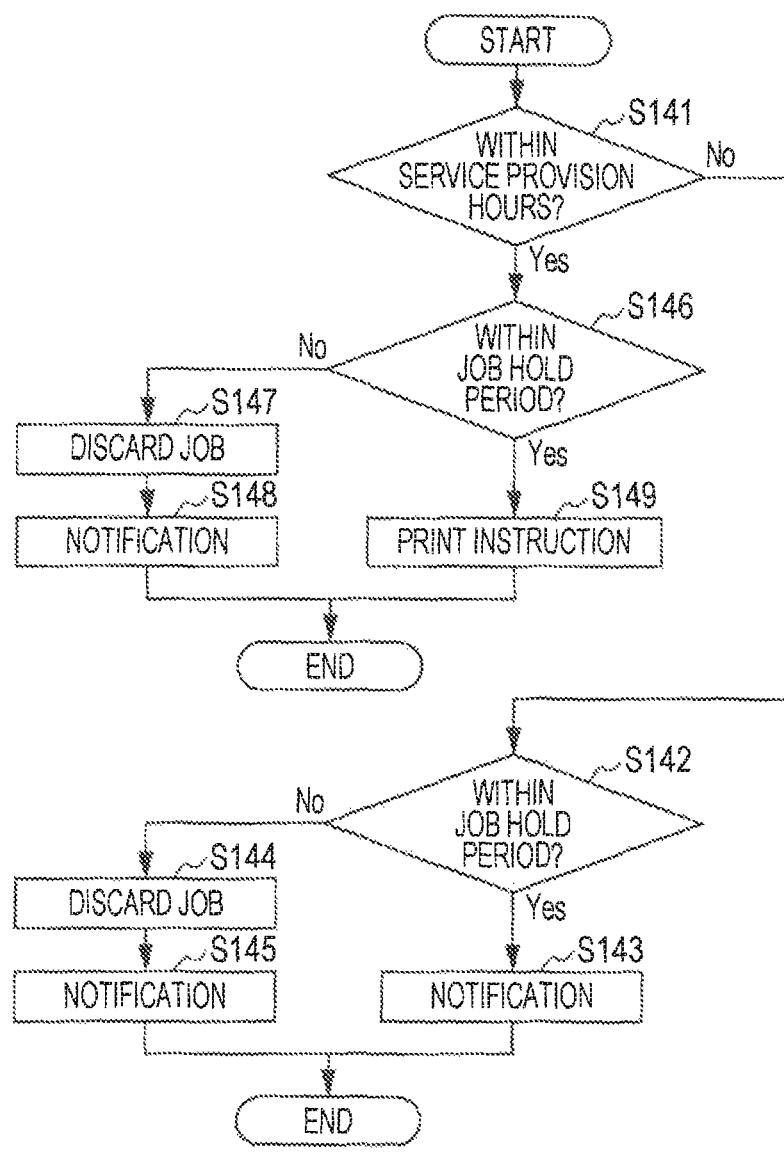
FIG. 14 is a diagram illustrating a flowchart of a print output instruction process routine.

FIG. 14 is a diagram illustrating a flowchart of the print output instruction process routine.

The print output instruction process routine is a routine that is started in step S131 of the monitoring process routine illustrated in FIG. 13 by using the position of the user as an argument.

First, the server apparatus 30 checks the current time and determines whether or not the current time is within the service provision hours (step S141). If the current time is out of the service provision hours, the server apparatus 30 determines whether or not the current time is within the job hold period that is set for the user (see FIG. 7). If the current time is within the job hold period, a notification "out of service provision hours" illustrated in FIG. 12 is given to the client apparatus 10 of the user who has transmitted the present job, with the job being held in the server apparatus 30 (step S143).

On the other hand, if it is determined in step S142 that the job hold period has elapsed, the server apparatus 30 discards the job (step S144) and then notifies the client apparatus 10 of the user who has transmitted the present job (step S145).

Figure 15:
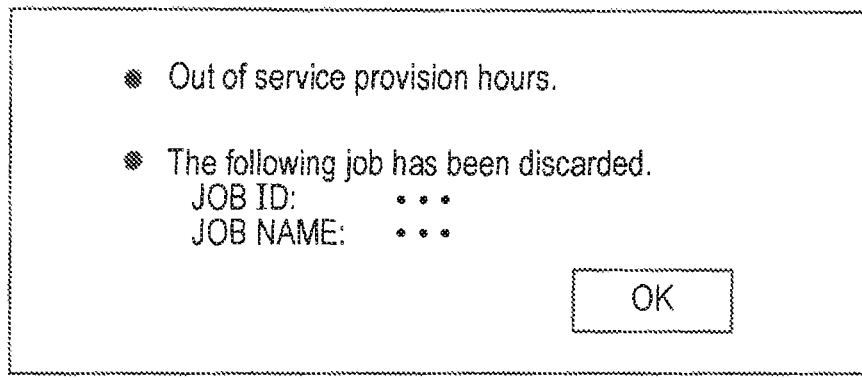
FIG. 15 is a diagram illustrating a notification screen that is displayed on the display screen of the client apparatus that has received a notification in a step in FIG. 14.

FIG. 15 is a diagram illustrating a notification screen that is displayed on the display screen of the client apparatus 10 that has received the notification in step S145 in FIG. 14.

Here, a message "out of service provision hours" and a message "the following job has been discarded" with specification of the job are displayed.

A further description will be given by referring back to FIG. 14.

If it is determined in step S141 that the current time is within the service provision hours, the server apparatus 30 determines whether or not the current time is within the job hold period (step S146). As illustrated in FIG. 7, the job hold period may be designated by hour. In this case, the job hold period may end within the service provision hours, and thus the determination in step S146 is necessary.

If it is determined in step S146 that the job hold period has elapsed, the server apparatus 30 discards the job (step S147) and notifies the client apparatus 10 of the user who has transmitted the present job (step S148).

Figure 16:
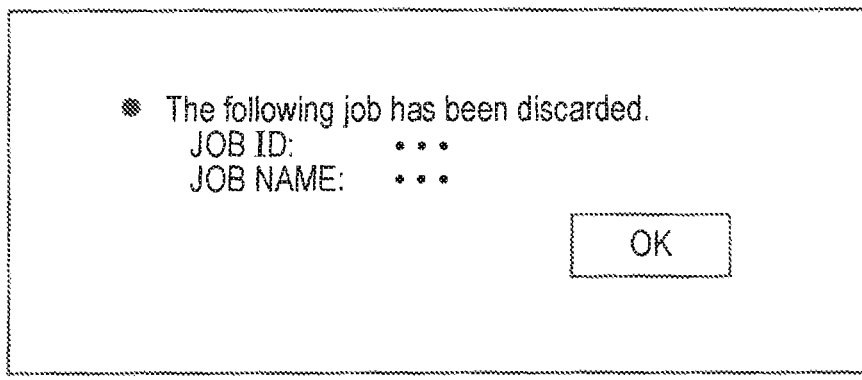
FIG. 16 is a diagram illustrating a notification screen that is displayed on the display screen of the client apparatus that has received a notification in a step in FIG. 14.

FIG. 16 is a diagram illustrating a notification screen that is displayed on the display screen of the client apparatus 10 that has received the notification in step S148 in FIG. 14.

Here, a message "the following job has been discarded" with specification of the job is displayed.

A further description will be given by referring back to FIG. 14.

If it is determined in step S146 that the current time is within the job hold period, the server apparatus 30 transmits the job to the self-propelled printer 20 on the floor where there is the user, with information on the current position of the user being used as an argument, so as to instruct the self-propelled printer 20 to perform print output (step S149).

In response to the print output instruction, the self-propelled printer 20 moves to the user, authenticates the user, and performs print output. After finishing the print output, the self-propelled printer 20 notifies the server apparatus 30 that the print output has finished.

If print output fails, the self-propelled printer 20 notifies the server apparatus 30 that the print output has failed.

Plural print output instructions may be consecutively provided to the self-propelled printer 20. In this case, the self-propelled printer 20 sequentially performs the plural instructions. An issue of priority, that is, which instruction among the plural instructions is to be given priority, is not addressed here. In any case, if plural instructions are provided, a time delay may occur when the self-propelled printer 20 moves to the user. Thus, when the self-propelled printer 20 arrives at a place where the user is supposed to be present, the user has moved from the place to another place. In this case, the self-propelled printer 20 does not perform user authentication when moving to the place where the user is supposed to be present. Thus, if user authentication is not performed (or user authentication fails) within a predetermined period, the self-propelled printer 20 notifies the server apparatus 30.

Figure 17:
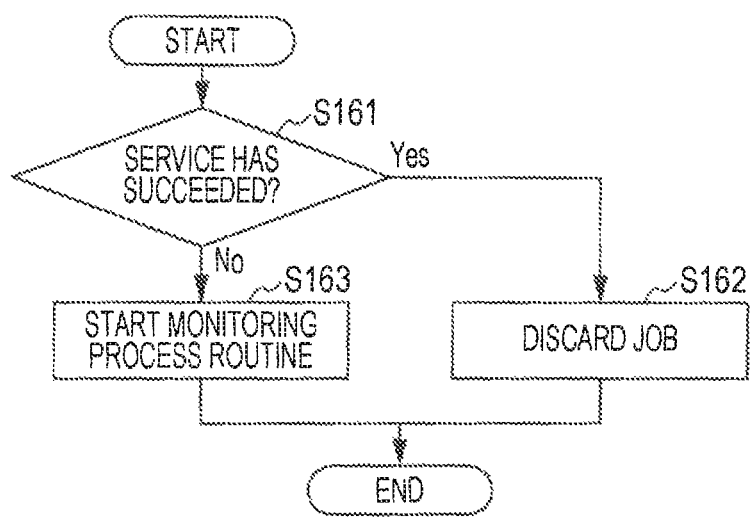
FIG. 17 is a diagram illustrating a flowchart of a report reception routine that is performed by the server apparatus that has received a report from a self-propelled printer.

FIG. 17 is a diagram illustrating a flowchart of a report reception routine that is performed by the server apparatus 30 that has received a report from the self-propelled printer 20.

Here, the server apparatus 30 determines whether the report indicates that the print output service has succeeded or failed (step S161). If the report indicates that the print output service has succeeded, the server apparatus 30 discards the present job stored in the server apparatus 30 (step S162), and the routine ends.

On the other hand, if the report indicates that the print output service has failed (step S161), the monitoring process routine illustrated in FIG. 13 is started again (step S163).

Next, a description will be given of a second exemplary embodiment of the present invention.

Figure 18:
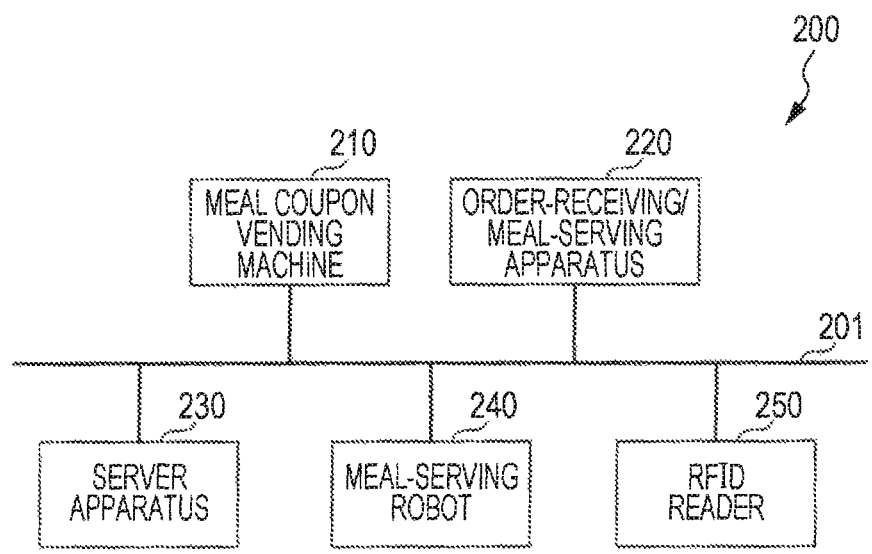
FIG. 18 is a diagram illustrating the overall configuration of a meal-serving system, which is a service providing system according to a second exemplary embodiment of the present invention.

FIG. 18 is a diagram illustrating the overall configuration of a meal-serving system 200, which is a service providing system according to the second exemplary embodiment of the present invention.

Figure 19:
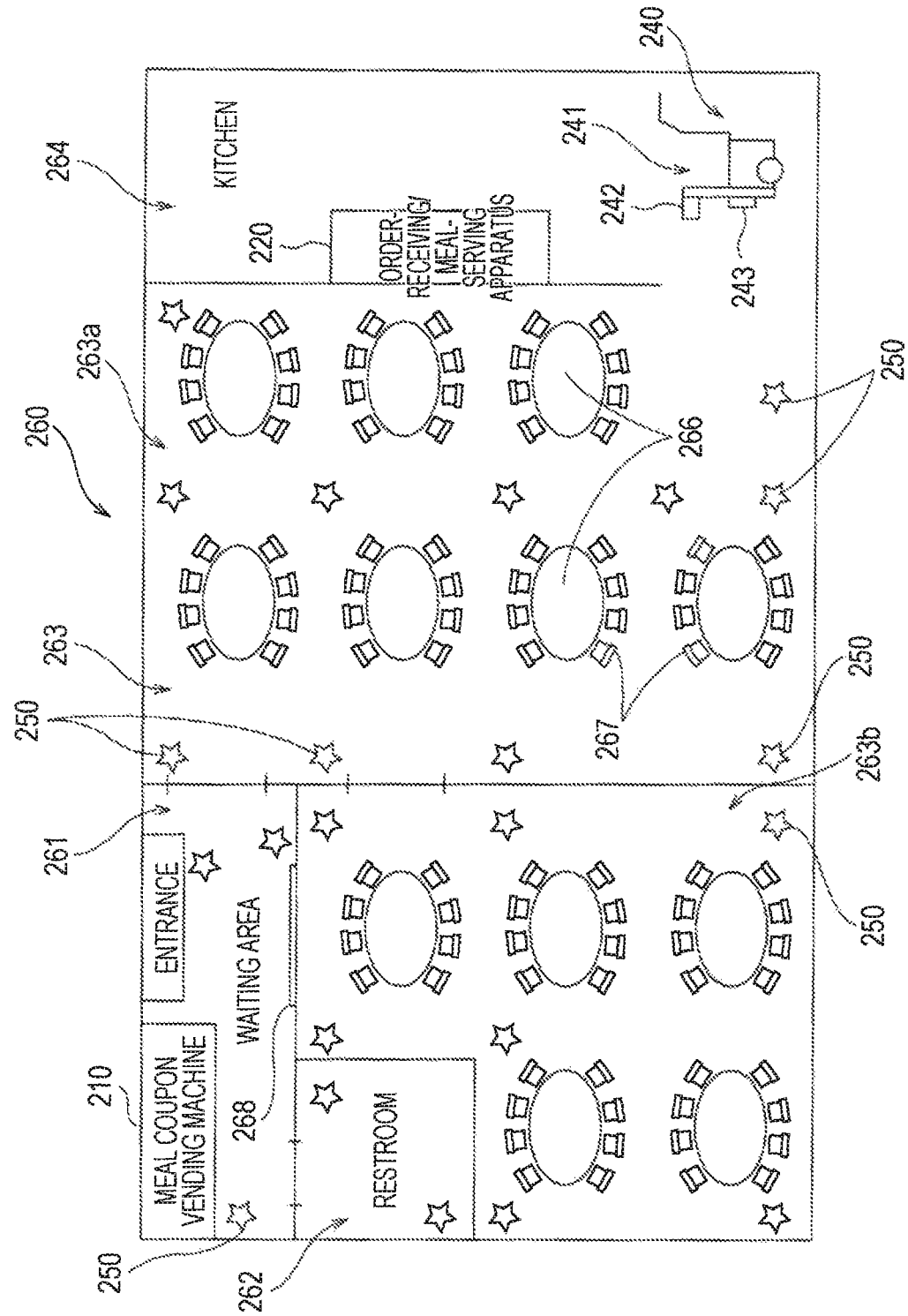
FIG. 19 is a schematic diagram illustrating the layout of a restaurant in which the meal-serving system illustrated in FIG. 18 is installed.

The meal-serving system 200 includes a meal coupon vending machine 210, an order-receiving/meal-serving apparatus 220, a server apparatus 230, a self-propelled meal-serving robot 240, and an RFID reader 250. The meal coupon vending machine 210, the order-receiving/meal-serving apparatus 220, the server apparatus 230, the meal-serving robot 240, and the RFID reader 250 are capable of communicating with one another through a wireless LAN 201. Here, only one meal-serving robot 240 is illustrated, but the meal-serving system 200 may include plural meal-serving robots 240. There are provided many RFID readers 250 as illustrated in FIG. 19, which will be described below, but only one RFID reader 250 is illustrated as a representative in FIG. 18. The roles of the meal coupon vending machine 210, the order-receiving/meal-serving apparatus 220, the server apparatus 230, the meal-serving robot 240, and the RFID reader 250 will be described below with reference to FIG. 19.

FIG. 19 is a schematic diagram illustrating the layout of a restaurant 260 in which the meal-serving system 200 illustrated in FIG. 18 is installed.

The restaurant 260 includes a waiting area 261 adjacent to an entrance, a restroom 262 whose entrance/exit is in the waiting area 261, a hall 263, and a kitchen 264. The hall 263 includes a non-smoking section 263a and a smoking section 263b. The meal coupon vending machine 210 is installed in the waiting area 261. Also, plural tables 266 and plural chairs 267 for each of the plural tables 266 are placed in the hall 263. Furthermore, the order-receiving/meal-serving apparatus 220 is installed in the kitchen 264. Also, in FIG. 19, the meal-serving robot 240 is illustrated in the kitchen 264. The meal-serving robot 240 includes a battery built therein (not illustrated), and is configured to move using the power stored in the battery. The position where the meal-serving robot 240 is illustrated in the kitchen 264 is the home position of the meal-serving robot 240, where a charging station for charging the battery of the meal-serving robot 240 is installed. The meal-serving robot 240 returns to the home position and the battery is charged when there is no meal-serving work to be done.

The meal coupon vending machine 210 is an apparatus that automatically vends meal coupons of dishes that are available at the restaurant 260. When a meal coupon is vended by the meal coupon vending machine 210, meal coupon information is transmitted to the server apparatus 230. The meal coupon information includes various pieces of information about the meal coupon, such as the time when the meal coupon is vended and the name of the dish. The server apparatus 230 stores the meal coupon information and transmits the meal coupon information to the order-receiving/meal-serving apparatus 220. The order-receiving/meal-serving apparatus 220 displays the meal coupon information on the display screen of the order-receiving/meal-serving apparatus 220. A cook looks at the display screen of the order-receiving/meal-serving apparatus 220 and is thereby able to know the sales status of meal coupons. Note that the meal-serving system 200 separately handles the sale of meal coupons and order reception of dishes corresponding to the meal coupons. This is because even if meal coupons are vended, seats may be unavailable and there may be customers on a waiting list. The order from each customer is received when the customer seats himself/herself. The waiting area 261 is provided with a panel 268 showing available seats. When a seat becomes available, a customer on a waiting list checks, on the panel 268, that there is an available seat and the position of the available seat, and moves to the seat. An employee of the restaurant 260 clears a table after a customer has finished with his/her meal, and then makes a notification indicating that there is an available seat and the table number of the seat, by using a remote control (not illustrated) carried by the employee. Accordingly, the information is displayed on the panel 268.

FIG. 19 does not illustrate the server apparatus 230 illustrated in FIG. 18. The server apparatus 230 is placed in an obscure place in the restaurant 260. The server apparatus 230 stores the overall layout of the restaurant 260 as a database.

Figure 20:
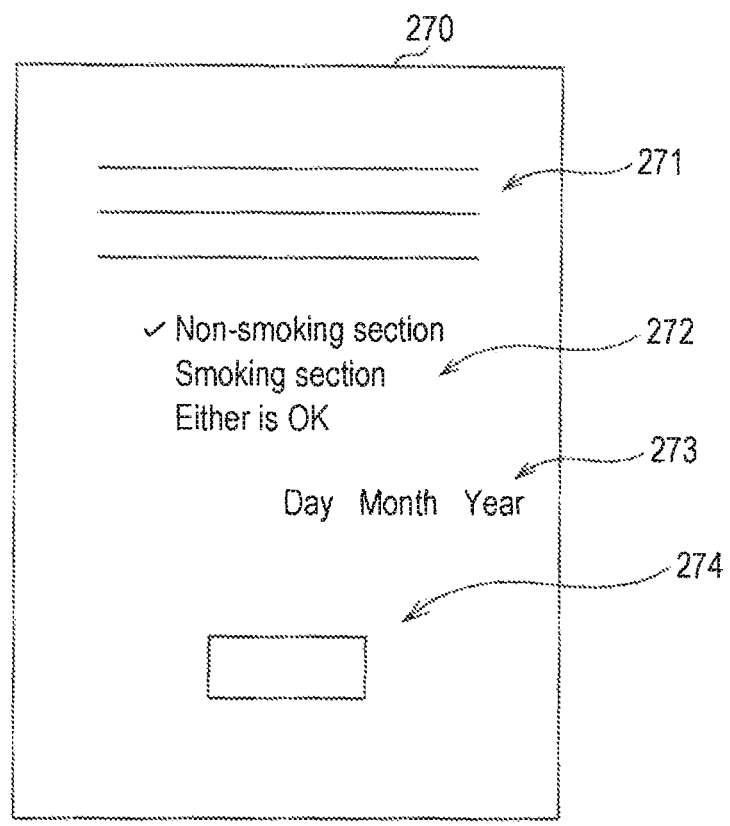
FIG. 20 is a schematic diagram illustrating a meal coupon that is vended by a meal coupon vending machine.

FIG. 20 is a schematic diagram illustrating a meal coupon 270 that is vended by the meal coupon vending machine 210.

At the time of purchasing a meal coupon from the meal coupon vending machine 210, a customer designates "non-smoking section", "smoking section", or "either is OK", in addition to a desired dish on the menu. A customer who has designated "non-smoking section" is able to use only the non-smoking section 263a. A customer who has designated "smoking section" is able to use only the smoking section 263b. A customer who has designated "either is OK" is able to use either of the non-smoking section 263a and the smoking section 263b.

The meal coupon 270 includes a name of a dish 271 to be ordered, a request 272 given at the purchase of the meal coupon 270: "non-smoking section, "smoking section", or "either is OK", and a date of sale 273 of the meal coupon 270.

Furthermore, the meal coupon 270 is embedded with an RFID tag 274. The RFID tag 274 contains electronic data written thereon. The electronic data represents information recorded on the meal coupon 270, such as a name of a dish. Furthermore, ID information specifying the meal coupon 270 is also written on the RFID tag 274. The meal coupon 270 is valid within the opening hours of the day on which the meal coupon 270 is vended.

A further description will be given by referring back to FIG. 19.

There are the RFID readers 250 installed throughout the restaurant 260. Each of the RFID readers 250 reads ID information of the meal coupon 270 from the RFID tag 274 of the meal coupon 270, and reports the ID information of the meal coupon 270, information representing the reception intensity for reading the ID information, and the ID information of the RFID reader 250 to the server apparatus 230. Accordingly, the server apparatus 230 recognizes the position of the customer having the meal coupon 270 with reference to the pieces of information obtained from the plural RFID readers 250.

When a customer who had been on a waiting list is seated, the server apparatus 230 obtains the seat number of the customer's seat, and notifies the order-receiving/meal-serving apparatus 220 of the name of a dish written on the meal coupon 270 of the customer, so as to order the dish. A cook checks the order information and prepares the dish. When the dish is prepared, the cook operates the order-receiving/meal-serving apparatus 220 to notify the server apparatus 230 that the ordered dish is ready. In response to the notification, the server apparatus 230 displays an instruction to deliver the dish to the customer on the order-receiving/meal-serving apparatus 220 at appropriate timing. The cook or waiter who has checked the instruction places the dish on a serving box 241 of the meal-serving robot 240, closes a lid

241*a* of the serving box 241, designates a seat number, and instructs the meal-serving robot 240 to deliver the dish. In response to the instruction, the meal-serving robot 240 moves to the seat by avoiding obstacles using a camera 242. The meal-serving robot 240 is provided with an RFID reader 243. The RFID reader 243 is different from the RFID readers 250 installed throughout the restaurant 260 and has a shorter read range. When a customer puts the meal coupon 270 over the RFID reader 243 of the meal-serving robot 240, the RFID reader 243 reads the information written on the RFID tag 274 embedded in the meal coupon 270. The customer who is seated puts his/her meal coupon 270 over the RFID reader 243 of the meal-serving robot 240 that has delivered the dish. Accordingly, the information written on the RFID tag 274 embedded in the meal coupon 270 is read by the RFID reader 243 and the information is transmitted to the server apparatus 230. The server apparatus 230 confirms the information, and if there is no mistake, instructs the meal-serving robot 240 to open the lid 241*a* of the serving box 241. Accordingly, the lid 241*a* of the serving box 241 opens and the dish is served to the customer.

Figure 21:
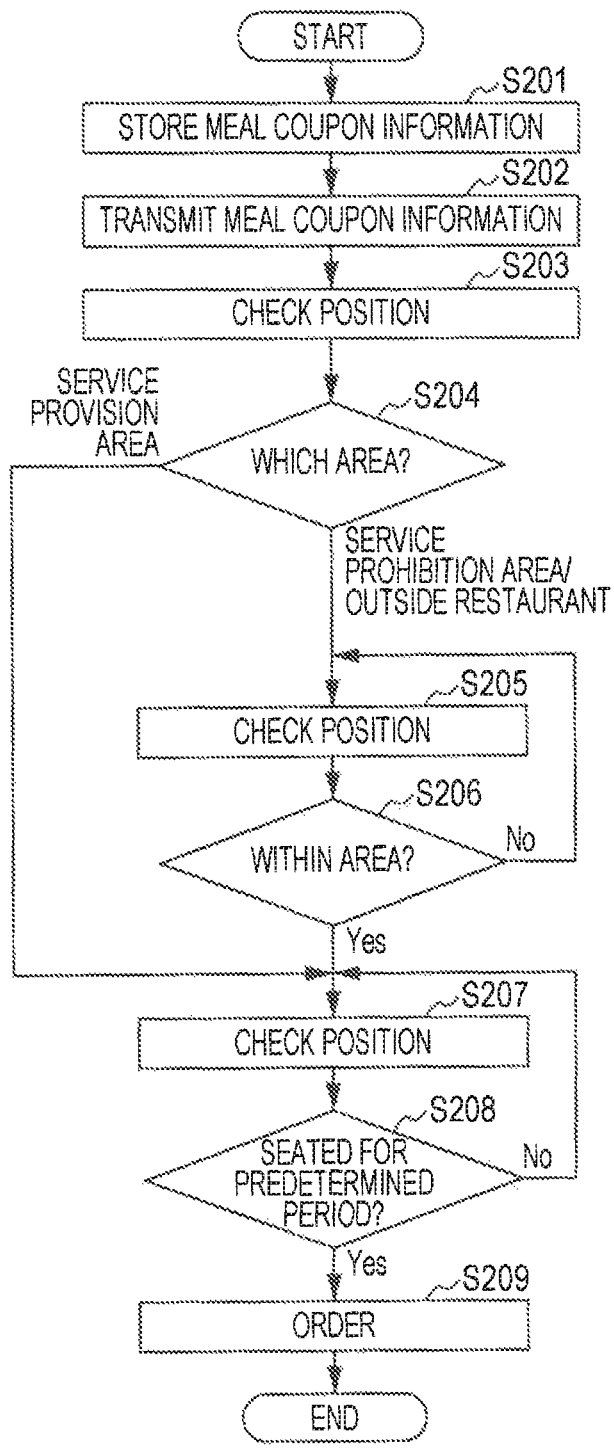
FIG. 21 is a diagram illustrating a flowchart of an order placement process routine performed by a server apparatus.

FIG. 21 is a diagram illustrating a flowchart of an order placement process routine performed by the server apparatus 230.

This order placement process routine is started when meal coupon information written on a meal coupon vended from the meal coupon vending machine 210 is transmitted to the server apparatus 230.

First, the server apparatus 230 stores the received meal coupon information in the server apparatus 230 (step S201) and transmits the meal coupon information to the order-receiving/meal-serving apparatus 220 (step S202). Accordingly, a cook is able to know that a meal coupon has been vended.

Subsequently, the server apparatus 230 checks the position of the customer who has purchased the meal coupon (step S203), and determines whether or not the position of the customer is within the service provision area (step S204). Whether or not the position is within the service provision area varies according to a customer. For a customer who designates "smoking section" when purchasing a meal coupon, only the smoking section 263*b* is a service provision area, and the other area, that is, the waiting area, the restroom, and the non-smoking section 263*a*, is a service prohibition area even within the restaurant 260. Likewise, for a customer who designates "non-smoking section" when purchasing a meal coupon, only the non-smoking section 263*a* is a service provision area. For a customer who designates "either is OK", both the non-smoking section 263*a* and the smoking section 263*b* are service provision areas.

In a case where the position of the customer is determined to be outside the service provision area, two cases are possible. One of them is that the customer is within the restaurant 260 but is outside the service provision area, and the other is that the customer has left the restaurant 260. A meal coupon that has been purchased is valid for the day of the sale, and thus the user may leave the restaurant 260 after purchasing the meal coupon. When the customer is within the restaurant 260, the position of the customer is recognized even if the customer is outside the service provision area. On the other hand, if the customer leaves the restaurant 260, the position of the customer is undetectable.

If it is determined in step S204 that the customer is not in the service provision area regardless of whether the customer is within or outside the restaurant 260, check of the position of the customer is regularly performed (step S205) until the customer comes back to the service provision area (step S206).

If it is determined in step S204 that the customer is within the service provision area or if it is determined in step S206 that the customer has come back to the service provision area, check of the position of the customer is continued (step S207). If it is determined that the customer has been seated for a predetermined period, for example, for one minute (step S208), the meal of the customer is ordered to the order-receiving/meal-serving apparatus 220 (step S209).

Figure 22:
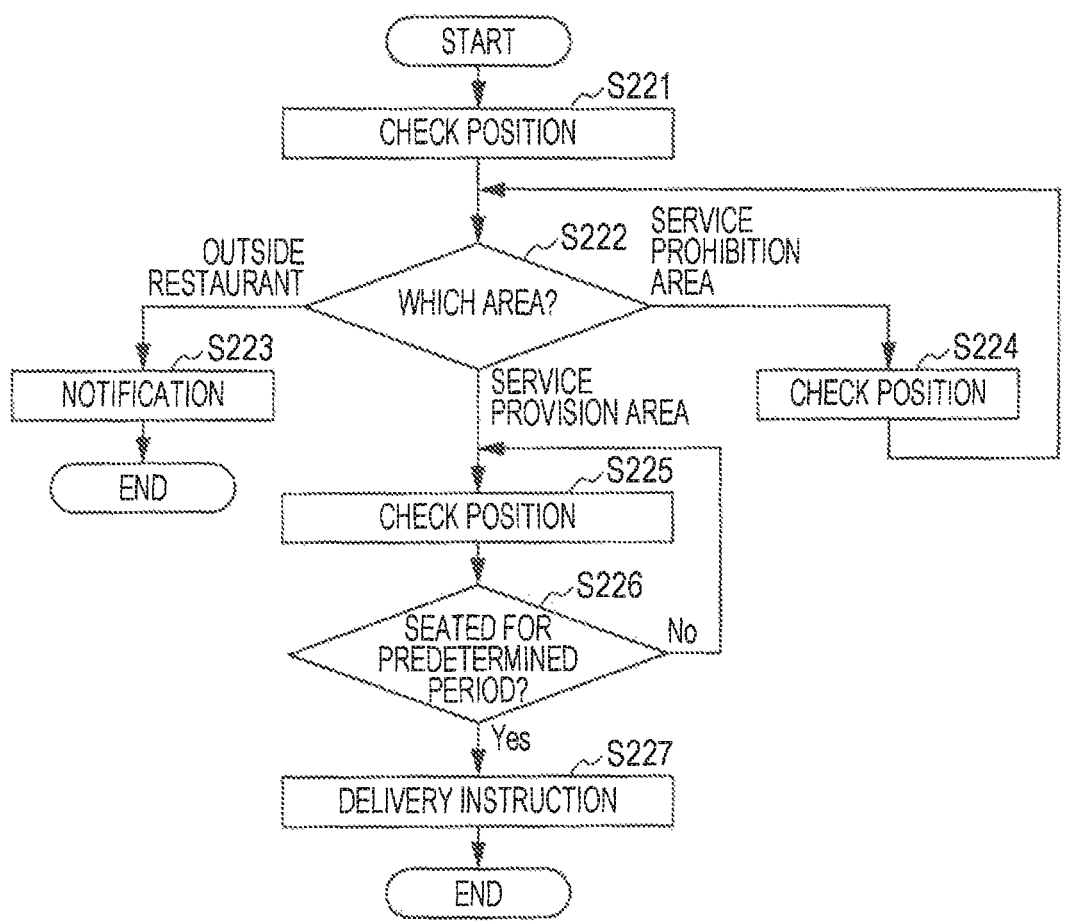
FIG. 22 is a diagram illustrating a flowchart of a delivery process routine that is performed by the server apparatus.

FIG. 22 is a diagram illustrating a flowchart of a delivery process routine that is performed by the server apparatus 230.

In response to receipt of a notification, through an operation of the order-receiving/meal-serving apparatus 220, indicating that the dish of the customer is ready, the server apparatus 230 starts the delivery process routine.

Here, the position of the customer is checked (step S221). If the customer is not within the restaurant 260, the server apparatus 230 notifies the order-receiving/meal-serving apparatus 220 (step S223). The process thereafter is handed over to an employee of the restaurant 260.

If it is determined in step S222 that the customer is within the restaurant 260 but is in the service prohibition area (for example, in the restroom), the server apparatus 230 continues checking the position until the customer comes back to the service provision area (step S224). If it is determined in step S222 that the customer is within the service provision area or that the customer has come back to the service provision area, the server apparatus 230 further continues checking the position (step S225). If the server apparatus 230 determines that the customer has been seated for one minute, for example (step S226), the server apparatus 230 transmits, to the order-receiving/meal-serving apparatus 220, an instruction to deliver the dish to the customer (step S227). The delivery instruction is displayed on the display screen of the order-receiving/meal-serving apparatus 220. A person in charge who has checked the instruction causes the meal-serving robot 240 to deliver the dish in the manner described above.

Figure 23:
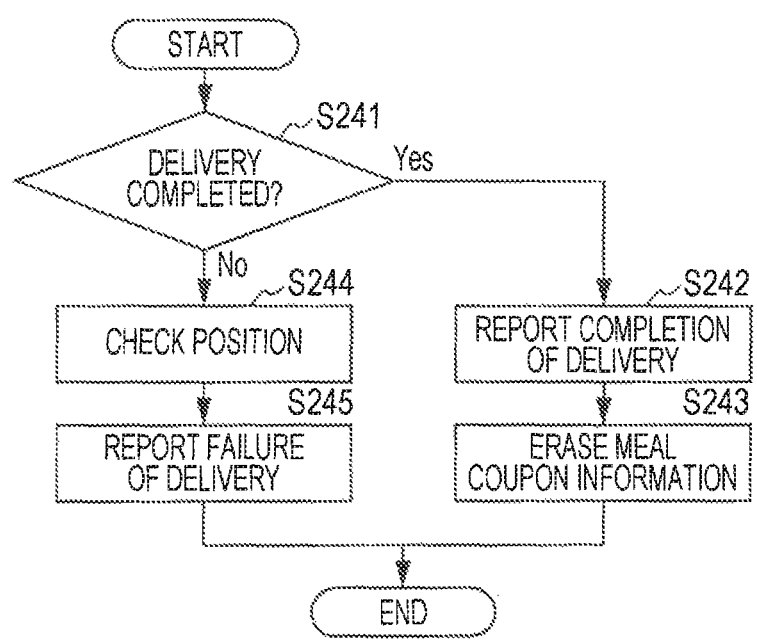
FIG. 23 is a diagram illustrating a flowchart of a report reception process routine that is performed by the server apparatus in response to receipt of a report from a meal-serving robot.

FIG. 23 is a diagram illustrating a flowchart of a report reception process routine that is performed by the server apparatus 230 in response to receipt of a report from the meal-serving robot 240.

If the report received from the meal-serving robot 240 indicates that delivery has been completed (step S241), the server apparatus 230 reports the completion of delivery to the order-receiving/meal-serving apparatus 220 (step S242) and erases the meal coupon information stored therein (step S243).

On the other hand, if the report received from the meal-serving robot 240 indicates that delivery has failed (step S241), the server apparatus 230 checks the position of the customer (step S244), and reports, to the order-receiving/meal-serving apparatus 220, information indicating that the delivery has failed and including the position information on the customer (step S245). The process thereafter is handed over to an employee of the restaurant 260. For example, if the customer goes to the restroom immediately after the meal-serving robot 240 starts delivery and if the delivery fails, the dish is delivered again at appropriate timing.

A description has been given of the print system 100 according to the first exemplary embodiment and the meal-serving system 200 according to the second exemplary embodiment. The service providing system according to an exemplary embodiment of the present invention is not limited to these two systems, and is widely applicable to various systems that detects the position of a user or the like, moves to the user, and provides a service to the user.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A service providing system comprising:
   a moving apparatus that moves to a user who is within a service provision area within a predetermined zone, the predetermined zone including the service provision area and a service prohibition area, and that provides a service to the user; and
   a service provision instruction apparatus that: recognizes a position of a user within the predetermined zone and a current time and that instructs the moving apparatus to provide a service to the user when the user is within the service provision area and the current time is within a job hold period; and determines whether a detection prohibition period is set for the service prohibition area,
   wherein
   whether or not the detection prohibition period is set is dependent on a location of the service prohibition area,
   if a position of the user is within the service prohibition area and the detection prohibition period is set, the service provision instruction apparatus waits for the position detection prohibition period to expire and then repeatedly checks the position of the user until the user returns to the service provision area,
   if a position of the user is within the service prohibition area and the position detection prohibition period is not set, the service provision instruction apparatus repeatedly checks the position of the user until the user returns to the service provision area, and
   at least one of the service provision area and the service prohibition area is set by selecting an area on a displayed screen.

2. The service providing system according to claim 1, wherein
   the moving apparatus is a self-propelled printer that propels itself to a user and that provides a print output service to the user, and
   the service provision instruction apparatus instructs the self-propelled printer to perform print output for a user in response to receipt of a print instruction from the user.

3. The service providing system according to claim 2, wherein if a position of a user who is to be provided with a service is within the service provision area and if the user has been staying at one place for a predetermined period, the service provision instruction apparatus instructs the moving apparatus to provide a service to the user.

4. The service providing system according to claim 3, wherein the service prohibition area or the service provision area is an area that is set for each user or each user group.

5. The service providing system according to claim 3, wherein the service prohibition area or the service provision area is an area that is set for each service.

6. The service providing system according to claim 2, wherein the service prohibition area or the service provision area is an area that is set for each user or each user group.

7. The service providing system according to claim 2, wherein the service prohibition area or the service provision area is an area that is set for each service.

8. The service providing system according to claim 1, wherein if a position of a user who is to be provided with a service is within the service provision area and if the user has been staying at one place for a predetermined period, the service provision instruction apparatus instructs the moving apparatus to provide a service to the user.

9. The service providing system according to claim 8, wherein the service prohibition area or the service provision area is an area that is set for each user or each user group.

10. The service providing system according to claim 8, wherein the service prohibition area or the service provision area is an area that is set for each service.

11. The service providing system according to claim 1, wherein the service prohibition area or the service provision area is an area that is set for each user or each user group.

12. The service providing system according to claim 1, wherein the service prohibition area or the service provision area is an area that is set for each service.

13. A service provision instruction method for a service provision instruction apparatus which communicates with a moving apparatus that moves to a user who is within a service provision area within a predetermined zone, the predetermined zone including the service provision area and a service prohibition area, and that provides a service to the user, the service provision instruction method comprising:
   recognizing a position of a user within the predetermined zone and a current time;
   instructing the moving apparatus to provide a service to the user when the user is within the service provision area and the current time is within a job hold period;
   determining whether a detection prohibition period is set for the service prohibition area,
   wherein whether or not the detection prohibition period is set is dependent on a location of the service prohibition area;
   if a position of the user is within the service prohibition area and the detection prohibition period is set, waiting for the position detection prohibition period to expire and then repeatedly checking the position of the user until the user returns to the service provision area; and
   if a position of the user is within the service prohibition area and the position detection prohibition period is not set, repeatedly checking the position of the user until the user returns to the service provision area,
   wherein at least one of the service provision area and the service prohibition area is set by selecting an area on a displayed screen.

14. A non-transitory computer readable medium storing a service provision instruction program executed by an information processing apparatus which communicates with a moving apparatus that moves to a user who is within a service provision area within a predetermined zone, the predetermined zone including the service provision area and a service prohibition area, and that provides a service to the user, the service provision instruction program causing the information processing apparatus to operate as a service provision instruction apparatus and to execute a process comprising:

recognizing a position of a user within the predetermined zone and a current time;

instructing the moving apparatus to provide a service to the user when the user is within the service provision area and the current time is within a job hold period;

determining whether a detection prohibition period is set for the service prohibition area, wherein whether or not the detection prohibition period is set is dependent on a location of the service prohibition area;

if a position of the user is within the service prohibition area and the detection prohibition period is set, waiting for the position detection prohibition period to expire and then repeatedly checking the position of the user until the user returns to the service provision area; and if a position of the user is within the service prohibition area and the position detection prohibition period is not set, repeatedly checking the position of the user until the user returns to the service provision area, wherein at least one of the service provision area and the service prohibition area is set by selecting an area on a displayed screen.

* * * * *